O. S. SCHAIRER.
ELECTRICAL REGULATOR.
APPLICATION FILED OCT. 5, 1911.

1,147,686.

Patented July 20, 1915.

WITNESSES:
K. J. Ridge
Fred H. Miller

INVENTOR
Otto S. Schairer
BY
Wiley S. Carr
ATTORNEY

UNITED STATES PATENT OFFICE.

OTTO S. SCHAIRER, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTRICAL REGULATOR.

1,147,686.  Specification of Letters Patent.  Patented July 20, 1915.

Application filed October 5, 1911. Serial No. 652,995.

*To all whom it may concern:*

Be it known that I, OTTO S. SCHAIRER, a citizen of the United States, and a resident of Edgewood Park, in the county of Allegheny and State of Pennsylvania, have invented a new and useful Improvement in Electrical Regulators, of which the following is a specification.

My invention relates to voltage and current regulators, and it has for its object to provide a simple and effective regulator for the field excitation of a dynamo-electric machine.

Figure 1:
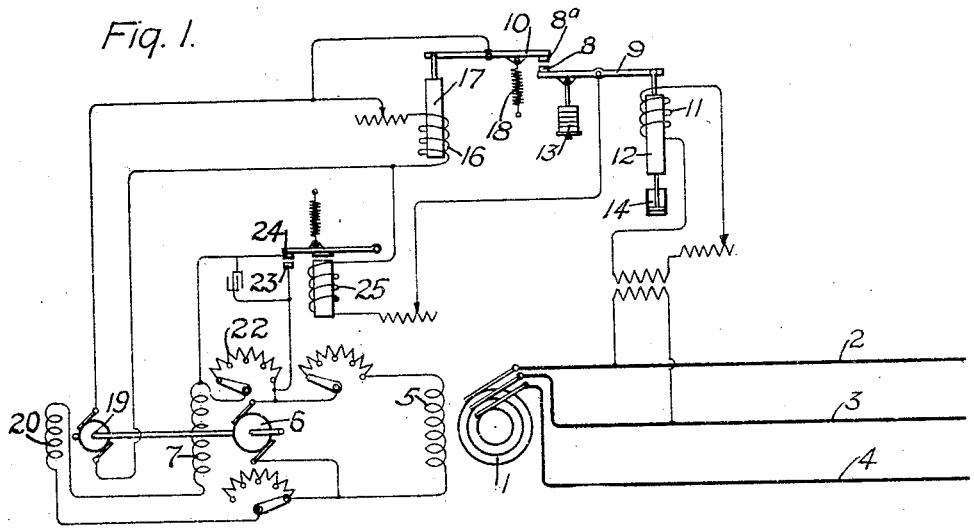
Figure 2:
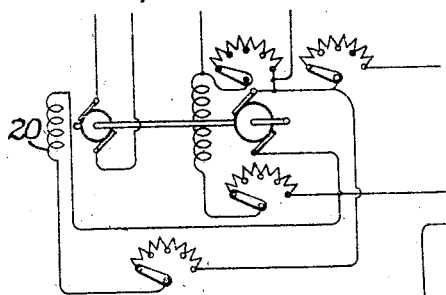
Figure 3:
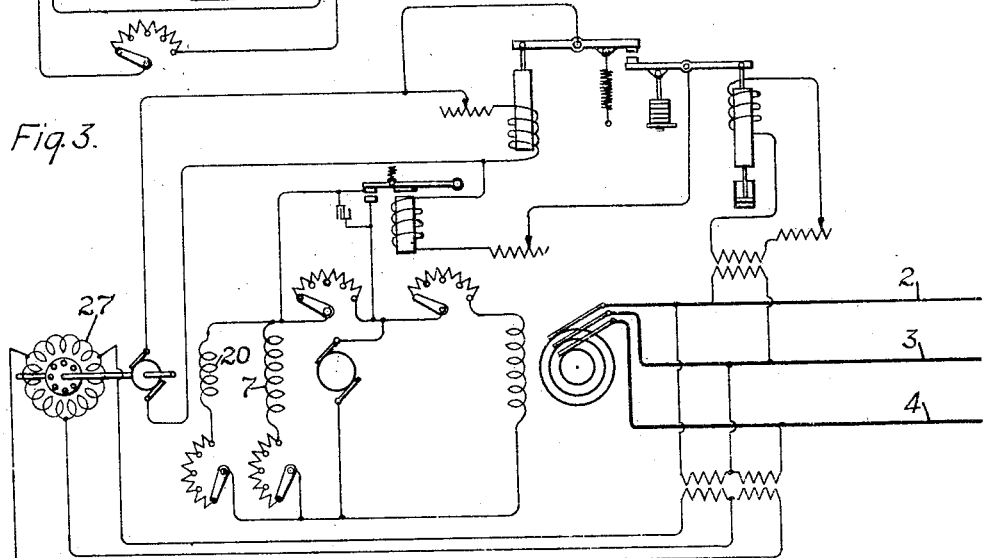

My invention is illustrated in the accompanying drawing, Figure 1 of which is a diagrammatic view of a system embodying the same; Fig. 2 is a similar view of a modification of a portion of the system of Fig. 1, and Fig. 3 is a diagrammatic view of still another modification of the system.

As illustrated, the system in connection with which the present invention is employed comprises a generator 1, that is connected to a distributing circuit 2—3—4 and the field magnet 5 of which is supplied from the armature 6 of an exciter having a field magnet winding 7 that is shunt excited, or that may be excited from any other suitable source.

The regulator comprises two coöperating movable contact members 8 and 8ª that are respectively carried by levers 9 and 10, the lever 9 being actuated by an electro-magnet winding 11 that receives energizing current from the distributing circuit 2—3—4. The core 12 of the winding 11 is partially counterbalanced by an adjustable counter-weight 13, and the movements of the lever 9 and contact member 8 are retarded by means of a dash pot 14. The winding 11 is energized to varying degrees by variations of the voltage of the circuit 2—3—4, and accordingly raises and lowers the core 12, thereby varying the distance of the contact member 8 from the member 8ª. If desired, instead of supplying the winding 11 with current proportional to the voltage of the circuit 2—3—4, it may be connected in series with one of the conductors of the said circuit or otherwise suitably supplied with current that is proportional to that traversing the said circuit.

The contact member 8ª and the lever 10 are actuated by an electromagnet winding 16 having a core 17 that is carried by the lever 10 and is somewhat more than counterbalanced by a spring 18. The winding 16 is supplied from the armature 19 of a small auxiliary generator that may be driven from the same source of power as the exciter, or by any other suitable means. The auxiliary generator is provided with a field magnet winding 20, the degree of excitation of which is varied in substantially the same manner as is the degree of excitation of the exciter field magnet winding. To this end, it is shown in Fig. 1 as connected in series with the exciter field magnet winding 7. The degree of energization of the winding 16 and the position of the contact member 8ª thus vary with the voltage of the auxiliary generator.

In series with the field magnet windings 7 and 20 is a resistor 22 that is adapted to be shunted by means of a relay device comprising a stationary contact member 23 and a coöperating movable contact member 24, the latter being actuated by a winding 25, the circuit of which is made and broken by the engagement and disengagement of the contact members 8 and 8ª. The said winding receives its energizing current from the armature of the auxiliary generator.

In the operation of the regulator, the position of the contact member 8 is caused, by the winding 11, to vary with the voltage of the circuit 2—3—4, or, if desired, it may be caused to vary with the current in the said circuit, or with any other desired electrical condition thereof. The contact member 8ª is moved into and out of engagement with the member 8 as the voltage of the auxiliary generator falls and rises, the fluctuation of the said voltage being caused by the opening and closing of the shunt circuit to the resistor 22. Thus, if the voltage of the circuit 2—3—4 diminishes, the contact terminal 8 will be raised, and, by reason of its engagement with the contact terminal 8ª, the relay winding 25 will be energized and will cause engagement of the terminal members 23 and 24. The establishment, in this manner, of a shunt to the resistor 22 causes the field magnet windings 7 and 20 to be more strongly excited, thereby in turn raising the voltages of both the exciter and auxiliary generator. The increase of the exciter voltage correspondingly increases the excitation of the main generator field magnet winding 5, thereby tending to raise the voltage of the said generator. By reason of the increase of the voltage of the auxiliary generator, the magnet winding 18 is more strongly energized and the contact terminal 8ª is moved out of engagement with the member 8. The contact terminals 23 and 24 thereby also become separated and the shunt circuit to the resistor 22 is interrupted. The result of this is that the excitations and voltages of the exciter and auxiliary generator are diminished and the contact member 8ª is again moved into engagement with the member 8. As the contact member 8 varies in position with the electrical condition of the distributing circuit, the periods of engagement and disengagement of the said member with the member 8ª will correspondingly vary, with the result that the excitation of the main generator will, by a proper construction and adjustment of the apparatus, be caused to vary in such a manner as to maintain the voltage, or other desired electrical condition of the generator, substantially constant or at a required value.

Instead of connecting the field magnet winding 20 of the auxiliary generator in series with the field magnet winding of the exciter, it may be connected across the exciter armature, so that its excitation will vary substantially as the exciter voltage. With this arrangement of connections, the variations of the excitation of the auxiliary generator will, of course, be delayed slightly with respect to the fluctuations of the exciter voltage, but will not be delayed as much as the excitation of the field of the main generator, because the inductance of the field of the small generator is much less than that of the field of the main generator.

In Fig. 3, the respective field magnet windings 7 and 20 of the exciter and of the auxiliary generator, are connected in parallel, and the excitations thereof are governed exactly as in Fig. 1. In Fig. 3, the auxiliary generator is also shown as driven by a small motor 24 that is preferably connected to the distributing circuit 2—3—4. The small motor and auxiliary generator thus form a motor-generator set which may be placed in any desired or convenient location.

In order to secure promptness and the proper degree of regulation of the excitation of the main generator, it is usually necessary that the exciter voltage be capable of fluctuation between wide limits. On the other hand it is desirable that the voltage applied to the windings 16 and 25 should not fluctuate so greatly, and this condition is obtainable in the present instance by constructing the exciter and auxiliary generator, and by adjusting the resistances of their field circuits, so that the ranges of their voltages bear any desired relation to each other. When a motor is employed for driving the auxiliary generator, the regulator may be readily adapted for use with any main generator or any exciter, irrespective of their voltages, and without change of the regulator coils or others of its parts, by simply employing a transformer of the proper ratio between the circuit 2—3—4 and the said motor. This is of great advantage to both manufacturer and user, since the regulators may be carried complete in stock ready for shipment and use and they may be adapted for use under widely varying conditions without modification.

The present regulator may be employed for regulating in accordance with variations of any other electrical condition than voltage, and for many other conditions than that specifically shown, and it may be employed in connection with direct current machines, as well as with alternators.

I claim as my invention:

1. The combination with a dynamo-electric machine, an exciter therefor, and an auxiliary generator that supplies no exciting current to the dynamo-electric machine, of a regulator for the dynamo-electric machine comprising means for correspondingly regulating the respective voltages of the exciter and the auxiliary generator.

2. The combination with a dynamo-electric machine, an exciter therefor, and an auxiliary generator that supplies no exciting current to the dynamo-electric machine, of a regulator for the dynamo-electric machine comprising means for correspondingly regulating the respective field excitations of the exciter and the auxiliary generator.

3. The combination with a dynamo-electric machine, an exciter therefor, and an auxiliary generator that supplies no exciting current to the dynamo-electric machine, of a regulator for the dynamo-electric machine comprising actuating windings energized respectively by the dynamo-electric machine and by the auxiliary generator, and means controlled by the said windings for correspondingly regulating the respective field excitations of the exciter and the auxiliary generator.

4. The combination with a dynamo-electric machine, an exciter therefor, and an auxiliary generator, the said exciter and auxiliary generator having independent armature circuits and field magnet windings connected to a common supply circuit, of a regulator for the dynamo-electric machine comprising means for regulating the resistance of the common supply circuit for the said field magnet windings.

In testimony whereof, I have hereunto subscribed my name this 29th day of Sept., 1911.

OTTO S. SCHAIRER.

Witnesses:
WESLEY G. CARR,
B. B. HINES.